United States Patent [19]

Gazza

[11] Patent Number: 5,601,391

[45] Date of Patent: Feb. 11, 1997

[54] DUAL GRIPPER PICKER ASSEMBLY FOR AN AUTOMATED STORAGE SYSTEM

[75] Inventor: Jack M. Gazza, Tucson, Ariz.

[73] Assignee: International Business Machines Corporation, Armonk, N.Y.

[21] Appl. No.: 598,310

[22] Filed: Feb. 8, 1996

Related U.S. Application Data

[63] Continuation of Ser. No. 491,469, Jun. 9, 1995, abandoned, which is a continuation of Ser. No. 264,095, Jun. 21, 1994, Pat. No. 5,460,476.

[51] Int. Cl.$^6$ ............................................. B65G 1/02
[52] U.S. Cl. ............................................. 414/280
[58] Field of Search .................................. 414/277, 278, 414/280, 786, 736; 294/86.4, 100, 902; 360/98.06, 99.06; 81/53.12; 369/36, 37

[56] References Cited

U.S. PATENT DOCUMENTS

| | | | |
|---|---|---|---|
| 4,170,030 | 10/1979 | Castrodale et al. | 360/98.06 |
| 4,675,856 | 6/1987 | Rudy et al. | 369/36 |
| 4,856,956 | 8/1989 | Zur | 414/280 |
| 4,858,979 | 8/1989 | Parma | 294/86.4 X |
| 5,128,912 | 7/1992 | Hug et al. | 369/36 X |
| 5,203,661 | 4/1993 | Tarita et al. | 414/280 X |
| 5,236,296 | 8/1993 | Ostwald | 414/280 |
| 5,277,540 | 1/1994 | Helms et al. | 414/280 X |

FOREIGN PATENT DOCUMENTS

| | | | |
|---|---|---|---|
| 3633508 | 4/1988 | Germany | 414/280 |
| 77004 | 5/1985 | Japan | 414/280 |

*Primary Examiner*—David A. Bucci
*Attorney, Agent, or Firm*—F. E. Anderson; D. A. Shifrin

[57] ABSTRACT

An automated storage system uses a pass-through picker assembly interposed between a storage device and a plurality of storage cells, wherein the pass-through picker assembly is mounted on an accessor and incorporates independently operating fore and aft grippers driven by a single motor. The fore and aft grippers are tandemly mounted such that the fore gripper can be aligned to one of a plurality of storage cartridges located with the storage cells, and the aft gripper can be aligned with a storage slot of the storage device. The pass-through picker design allows the fore gripper to grasp a storage cartridge, feed the cartridge through to the aft gripper, release, and then allow the aft gripper to grip and pass the storage cartridge to the storage slot. In this way, a special priority cell of the storage cells, directly across from the storage slot, can very quickly pass a priority storage cartridge directly to the storage device without moving the pass-through picker assembly.

10 Claims, 11 Drawing Sheets

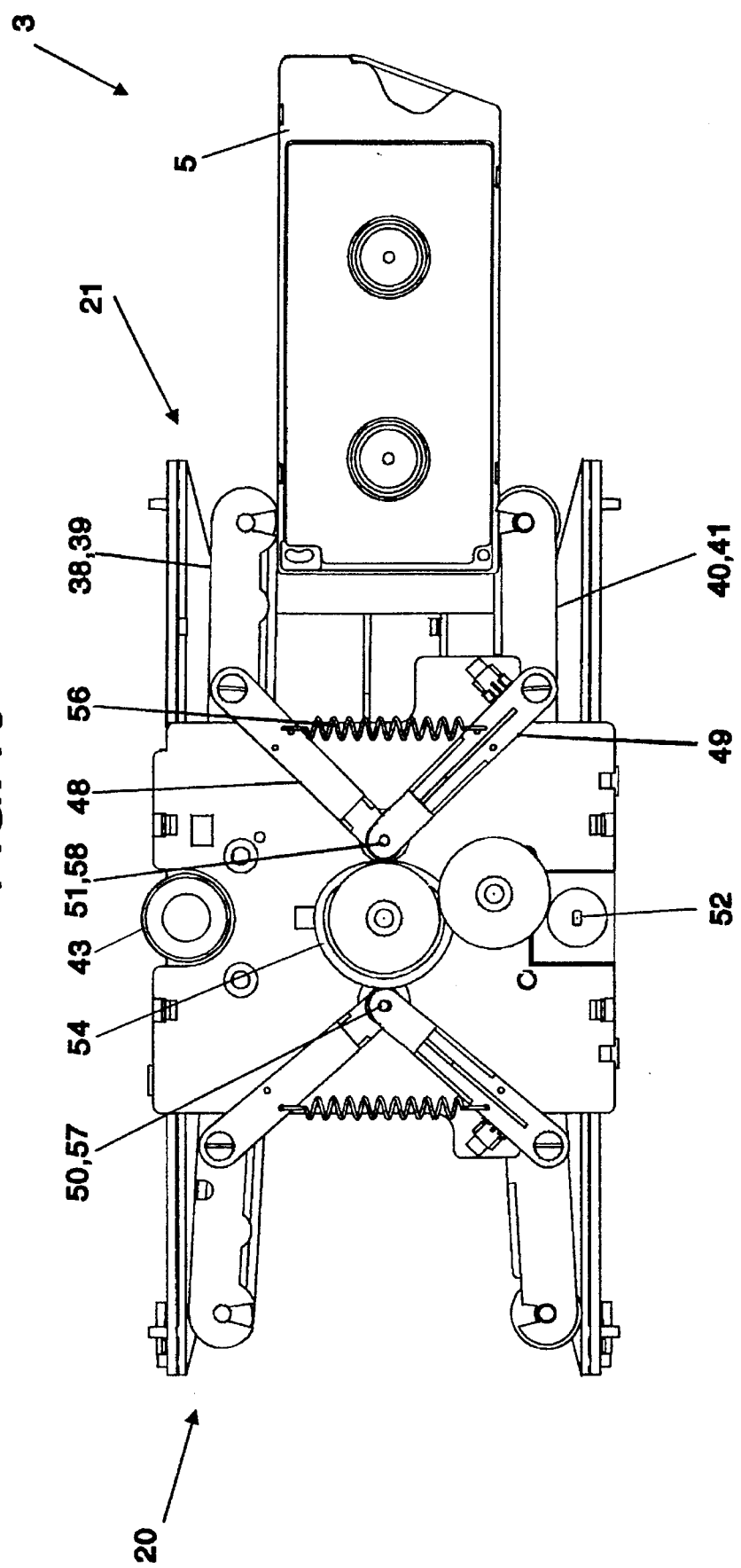

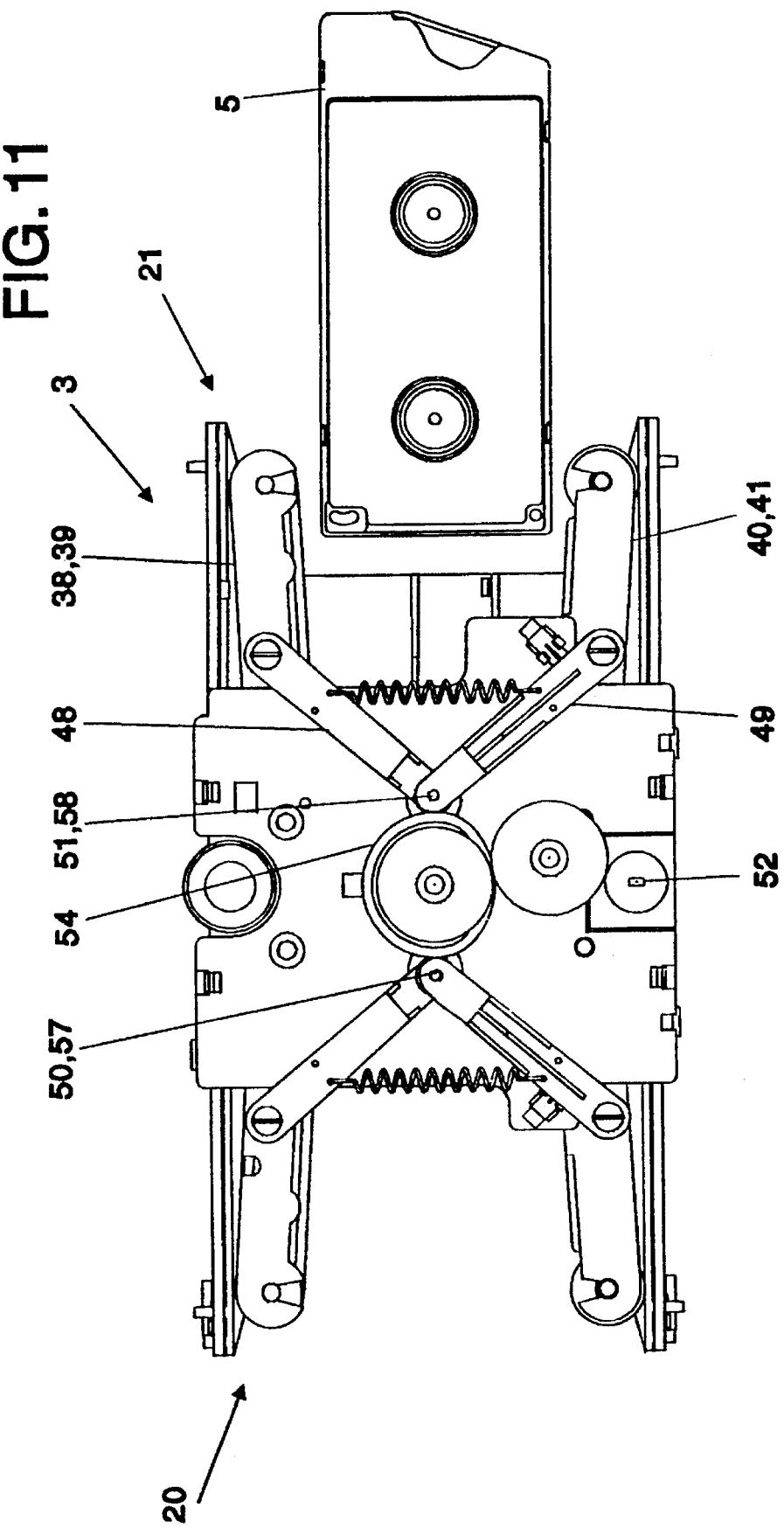

DUAL GRIPPER PICKER ASSEMBLY FOR AN AUTOMATED STORAGE SYSTEM

This application is a continuation of U.S. patent application Ser. No. 08/491,469 filed Jun. 9, 1995, now abandoned, which application is a continuation of U.S. patent Ser. No. 08/264,095 filed Jun. 21, 1994, now U.S. Pat. No. 5,460,476, issued on Oct. 24, 1995.

FIELD OF THE INVENTION

The present invention relates generally to robotic handling systems, and more particularly, to a storage system having a picker assembly for passing a storage medium through the picker and into the storage device.

BACKGROUND OF THE INVENTION

Many business and science applications use computers to record data, with much of the data being stored on removable media. The removable media may take the form of a magnetic tape cartridge, an optical disk cartridge, floppy diskettes, or floptical diskettes. The advantages of storing data on removable media are numerous. These advantages include a capability of storing large amounts of data (additional cartridges can be used to store additional data), providing a vehicle for long term storage and archival, backing up data which resides on non-removable media, and allowing for easy transfer of data between computers. Often the removable media is the most economical method of retaining the stored data.

In the past, when a request for a specific removable media cartridge was made, an operator needed to retrieve the data cartridge and physically load the cartridge into the storage device. This manual mode involved a significant delay while the cartridge was being retrieved by the operator before the data on that cartridge could be processed. Additionally, the operator could easily make an error and load an incorrect cartridge.

With advancements in data storage products, the media cartridges were reduced in size and robots were designed and incorporated to automatically retrieve cartridges and load those cartridges into a storage device. The robot is housed within an automated storage library that also contained storage devices and a plurality of cartridges placed within storage cells. The robot replaced the operator and improvements were seen in access time and in reliability. However, because the robot is a complex machine requiring multiple degrees of freedom (rotation and translation about the mechanical Joints) it would require maintenance and adjustments. The robot's complexity also resulted in a significant manufacturing and maintenance costs.

The difficulties that exist with the multiple degrees of freedom within a robot have been addressed, to some degree, by using a pass-through picker. The pass-through picker is the assembly that retrieves a cartridge from a storage cell and places the cartridge into the storage device. The pass-through picker assembly is positioned within an automated storage system between the storage device and the storage cells. The storage cells are typically located parallel to and opposite the storage device. The pass-through picker retrieves a cartridge from the storage cell, passes the cartridge through its structure, and transfers the cartridge to the storage device. Although this reduces the complexity of the picker as compared to a robot, the pass-through picker limits the location of the storage cells to being opposite the storage device. As data storage products further progress, this limitation does not allow for the total number of storage cells to be maximized within the automated storage system. Additionally, there is an ever increasing need to provide still greater amounts of storage capabilities in smaller spaces. Therefore, the pass-through picker in combination with the storage device and storage cells should use space very efficiently.

What is needed is a pass-through picker having the capability to retrieve cartridges from storage cells that are located both opposite and adjacent to the storage device. This improvement would allow for the volume of the automated storage system to be populated with a maximum number of storage cells, and maintain a relatively simple mechanism as compared with a robot. Furthermore, if the pass-through picker assembly were capable of transferring a cartridge into the storage device without disturbing a cartridge that was directly opposite a load slot of the storage device, then a cartridge could be located directly opposite the storage device and the access time to load that cartridge would be minimal.

SUMMARY OF THE INVENTION

An object of the present invention is to provide an improved picker mechanism for transporting storage media.

Another object of the present invention is to provide an automated storage system having a picker mechanism that can randomly access storage media while minimizing time to access such storage mediums and minimizing space required by the picker mechanism.

According to a first embodiment of the present invention, a picker assembly for transporting a storage medium from a storage cell to a storage device and vice versa, includes a mounting channel having a fore gripper and an aft gripper mounted parallel thereto, wherein the fore and aft grippers are located in tandem with one another. A cam motor connects to the fore and aft grippers for closing the fore gripper and opening the aft gripper when rotating the cam motor in a first direction, and for closing the aft gripper and opening the fore gripper when rotating the cam motor in an opposite direction. A belt motor drives belts of the fore and aft grippers for moving a gripped storage medium from the fore gripper to the aft gripper when the belt motor is rotated in a first direction, and for moving the storage medium from the aft gripper to the fore gripper when said belt motor is rotated in a second direction.

In another embodiment of the present invention, a method for transporting an article from a first location to a second location, wherein a picker mechanism having independently operating fore and aft grippers mounted in tandem on a mounting channel for securing, moving, and releasing the article, is utilized. The method includes the steps of: (a) moving the picker assembly to the article for locating the article between the fore gripper; (b) gripping the article by closing the fore gripper; (c) moving the article out of the first position and into an intermediate position between the fore and aft grippers; (d) opening the fore gripper; (e) transporting the picker mechanism for moving the article adjacent to a second position; (f) re-gripping the article by closing the aft gripper; and (g) moving the article into the second position and opening the aft gripper.

The foregoing and other objects, features, and advantages of the invention will be apparent from the following more particular description of a preferred embodiment of the invention, as illustrated in the accompanying drawing.

BRIEF DESCRIPTION OF THE DRAWINGS

FIG. 10 is a side view showing the cartridge transferred from the picker assembly into the storage device, with the aft gripper closed.

FIG. 11 is a side view of the picker assembly that shows the aft gripper open and the cartridge released into the storage device.

DETAILED DESCRIPTION OF THE INVENTION

Figure 1:
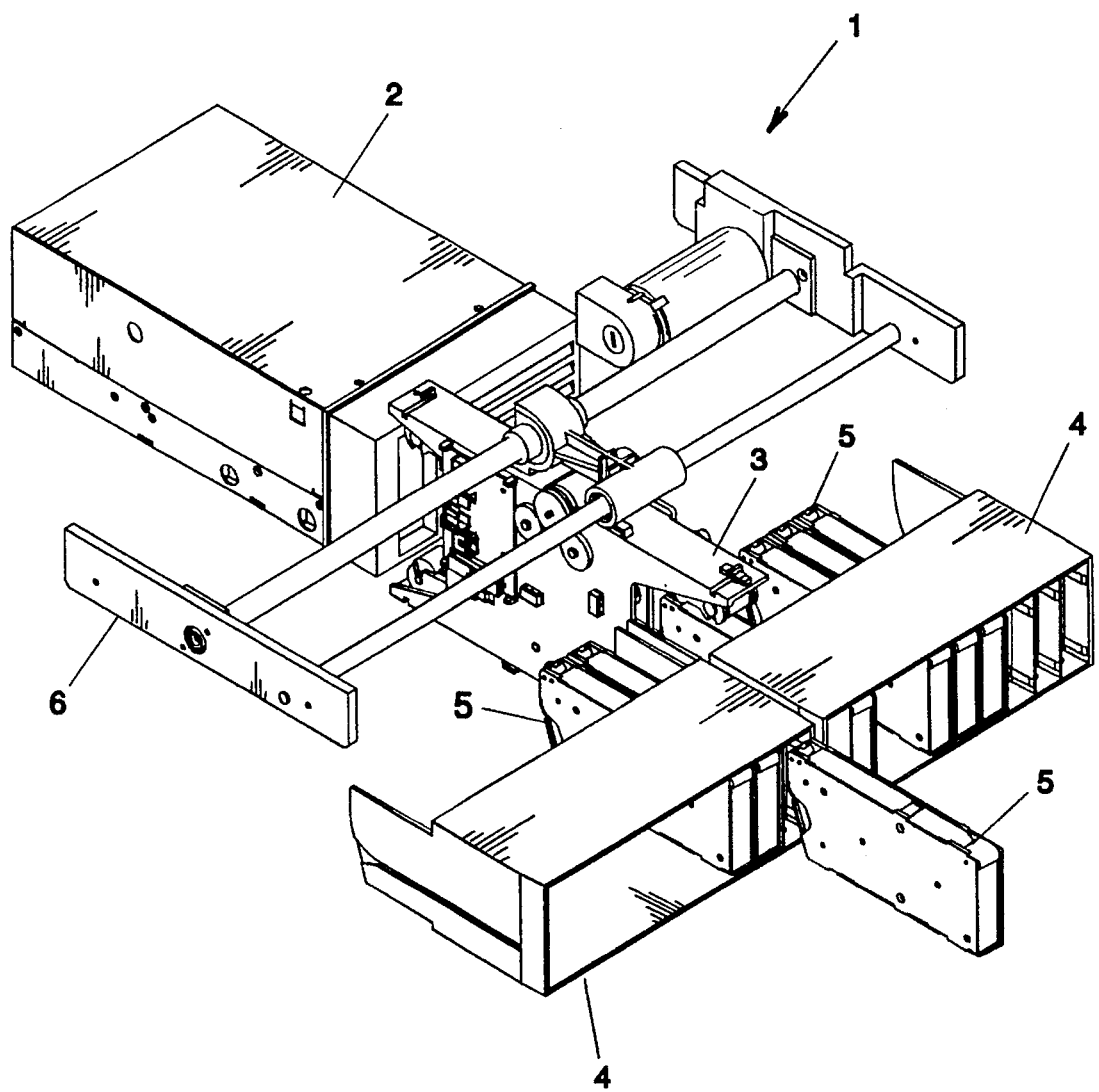
FIG. 1 is a pictorial diagram of an automated storage system having magazines containing removable media, a storage device, and a picker assembly with two tandem, independent grippers.

Referring now to the illustrations, like numerals correspond to like parts depicted in the figures. The invention will be described as embodied in an automated magnetic tape storage system for use in a data processing environment. Although the invention is shown using magnetic tape cartridges, one skilled in the art will recognize that the invention equally applies to optical disk cartridges. Furthermore, the description of an automated magnetic tape storage system is not meant to limit the invention to data storage applications as the invention described herein can be applied to robotic handling systems in general. FIG. 1 shows an automated storage system 1 for managing removable media, for example magnetic tape. The removable media is contained within a plurality of data cartridges 5. Each data cartridge 5 is located within a magazine 4, wherein each magazine 4 includes a plurality of storage cells for holding the plurality of data cartridges 5. The magazine 4 provides a means of retaining each data cartridge 5 while also allowing access to retrieve the plurality of data cartridges 5 via a picker assembly 3.

The automated storage system 1 also includes at least one storage device 2, for example an IBM 3490 Magnetic Tape Drive. The magazine 4 is located across from and parallel to the storage device 2. A magazine may also reside parallel and adjacent to the storage device 2 (not shown). The picker assembly 3 transports a data cartridge 5 from the magazine 4 to a storage slot in the storage device 2. The picker assembly 3 is attached to an accessor 6 that translates the picker assembly parallel to the storage device 2 and magazine 4. This translation allows the picker assembly 3 to be positioned directly in line with any of the plurality of data cartridges 5 and/or the storage slot.

Upon being positioned in line with a selected data cartridge 5, the picker assembly 3 retrieves the data cartridge 5 from the magazine 4. The data cartridge 5 is retained within the picker assembly 3 while the picker assembly 3 is translated to the storage device 2 via the accessor 6. At the storage device 2, the picker assembly 3 transfers the data cartridge 5 into the storage device 2. After the storage device 2 has processed the data cartridge 5, the picker assembly 3 removes the data cartridge 5 from the storage device 2 and is translated back to the originating storage cell (or an empty storage cell) within the magazine 4, where the picker assembly 3 transfers the data cartridge 5 back into the magazine 4.

Figure 2:
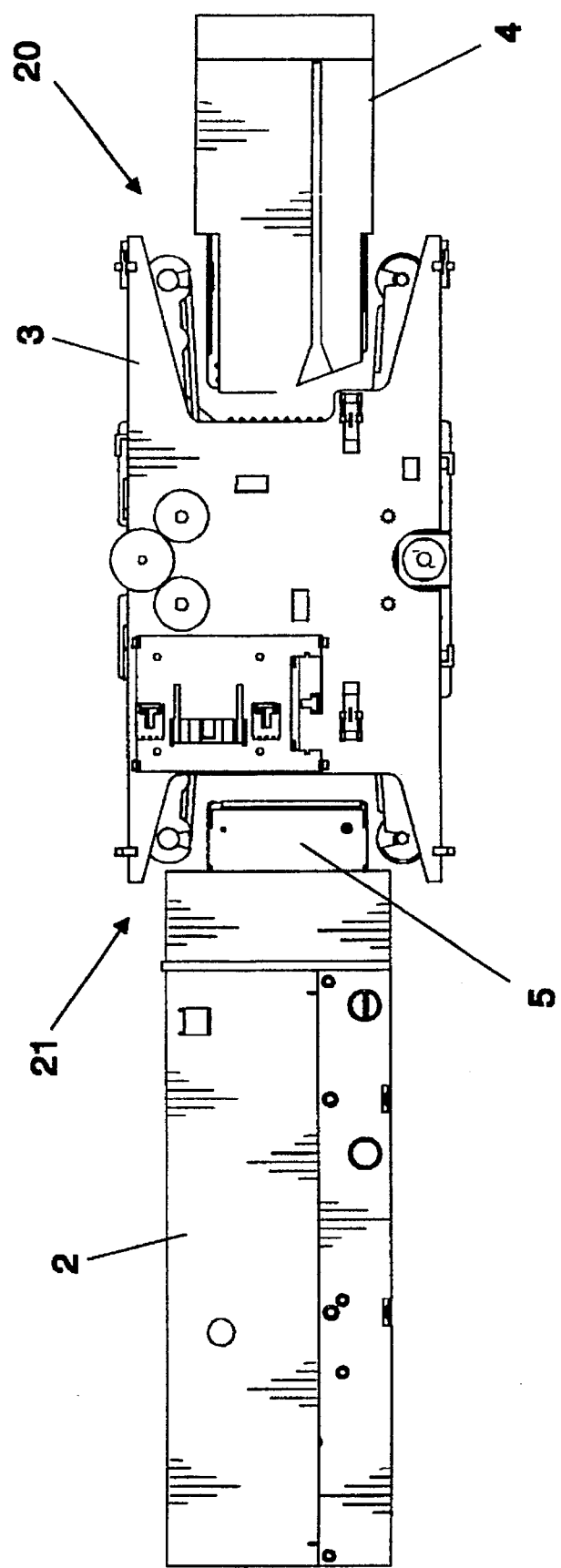
FIG. 2 is a side view of the automated storage device illustrating a picker assembly utilizing a fore and aft gripper.

Referring now to FIG. 2, a tandem relationship of fore and aft grippers 20 and 21, respectively, of the picker assembly 3 is shown. The fore gripper 20 faces the magazine 4, and the aft gripper 21 faces the storage device 2. The tandem relationship of the fore gripper 20 to the aft gripper 21 enables a data cartridge to "pass-thru" the picker assembly 3, hence the picker assembly 3 operates an a pass-thru picker. Both the fore and aft grippers 20, 21 extend beyond an envelope of the data cartridges 5 when a data cartridge 5 is present on either side of the picker assembly 3. For the picker assembly to be translated, the fore and aft grippers must be in an open position (as shown) to avoid an interference with any residing data cartridges 5. Note that by operating the fore and aft grippers 20, 21 independently, a distance separating the magazine 4 from the storage device 2 can be minimized since the fore gripper 21 can be held open except when grabbing a data cartridge 5. Additionally, there is no need to translate the picker assembly perpendicular to the storage device 2 and the magazine 4.

In order to retrieve a data cartridge 5 from the magazine 4 or the storage device 2, the appropriate fore or aft gripper 20, 21 must close and contact the given data cartridge. The picker assembly 3 described herein allows for the fore and aft grippers 20, 21 to operate independently, i.e., the fore gripper 20 can be maintained in an open position while the aft gripper 21 is actuated open or closed, or vice versa. A benefit realized by independent gripper operation is that a given data cartridge can be retrieved or returned by the picker assembly 3 without disturbing other data cartridges 5.

Figure 3:
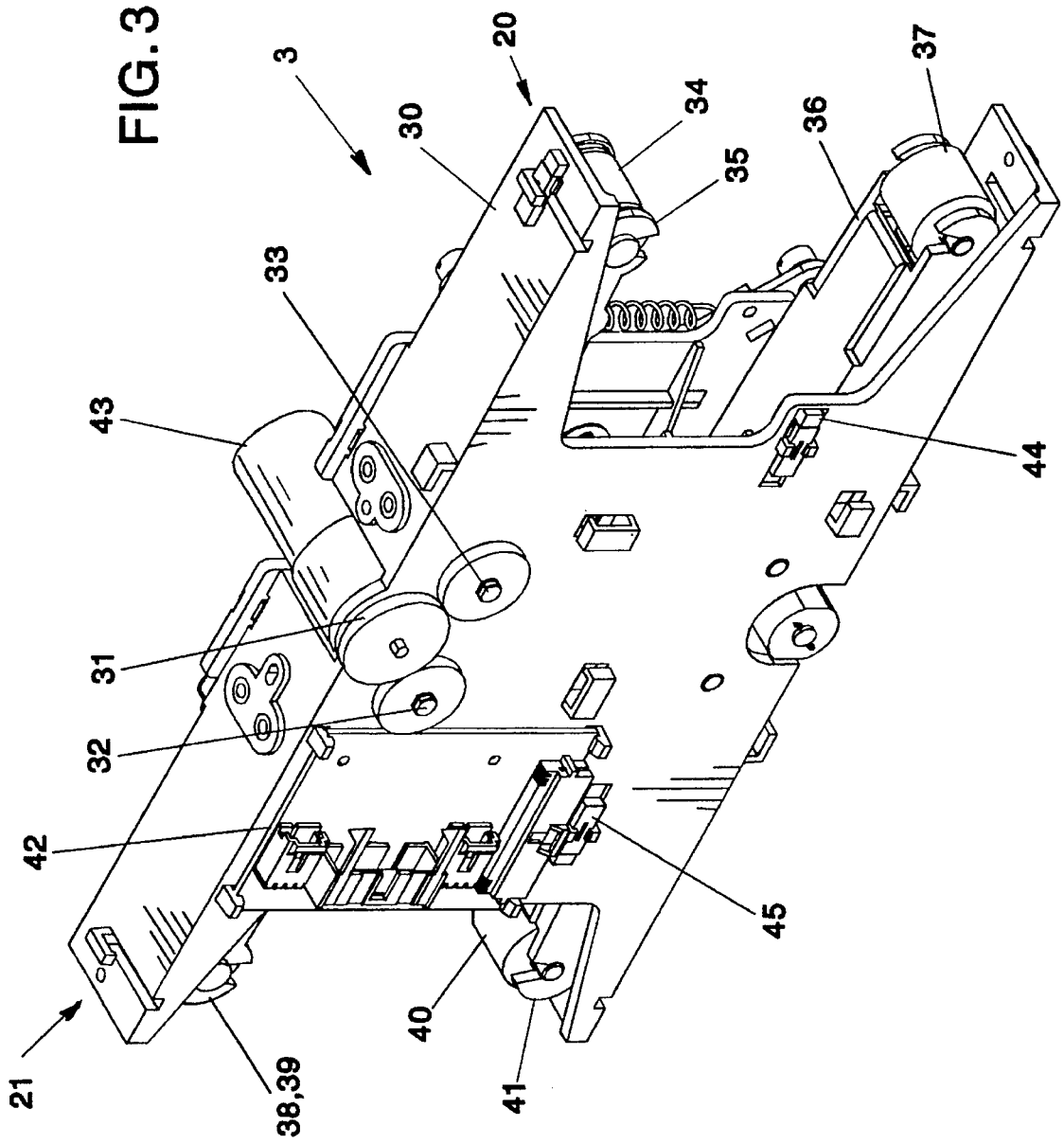
FIG. 3 is a perspective view of the picker assembly showing the belt drive train.

FIG. 3 shows the picker assembly 3 in greater detail, including those components used to independently drive the fore gripper 20 and the aft gripper 21. Both fore and aft grippers 20, 21 are affixed to a mounting channel 30 (mounting structure). Each fore and aft gripper 20, 21 consists of a timing belt 34 and 38, respectively, mounted within a support channel 35 and 39, respectively. Each timing belt 34 and 38 provide a friction drive to translate the data cartridge 5 between the fore and aft grippers 20, 21. An opposing side of each fore and aft gripper 20, 21 includes a plastic guide 36 and 41, respectively, that contains a free-rotating roller 37 and 40, respectively. A single motor 43 is centrally located between the fore and aft grippers 20, 21 for providing a rotational drive for both timing belts 34 and 38 via a pinion 31 and gears 32 and 33. A circuit card 42 acts as an interconnect to provide power to the motor 43 (and to a fore and aft gripper motor) and to provide signal lines to various sensors pairs 44 & 45.

Figure 4:
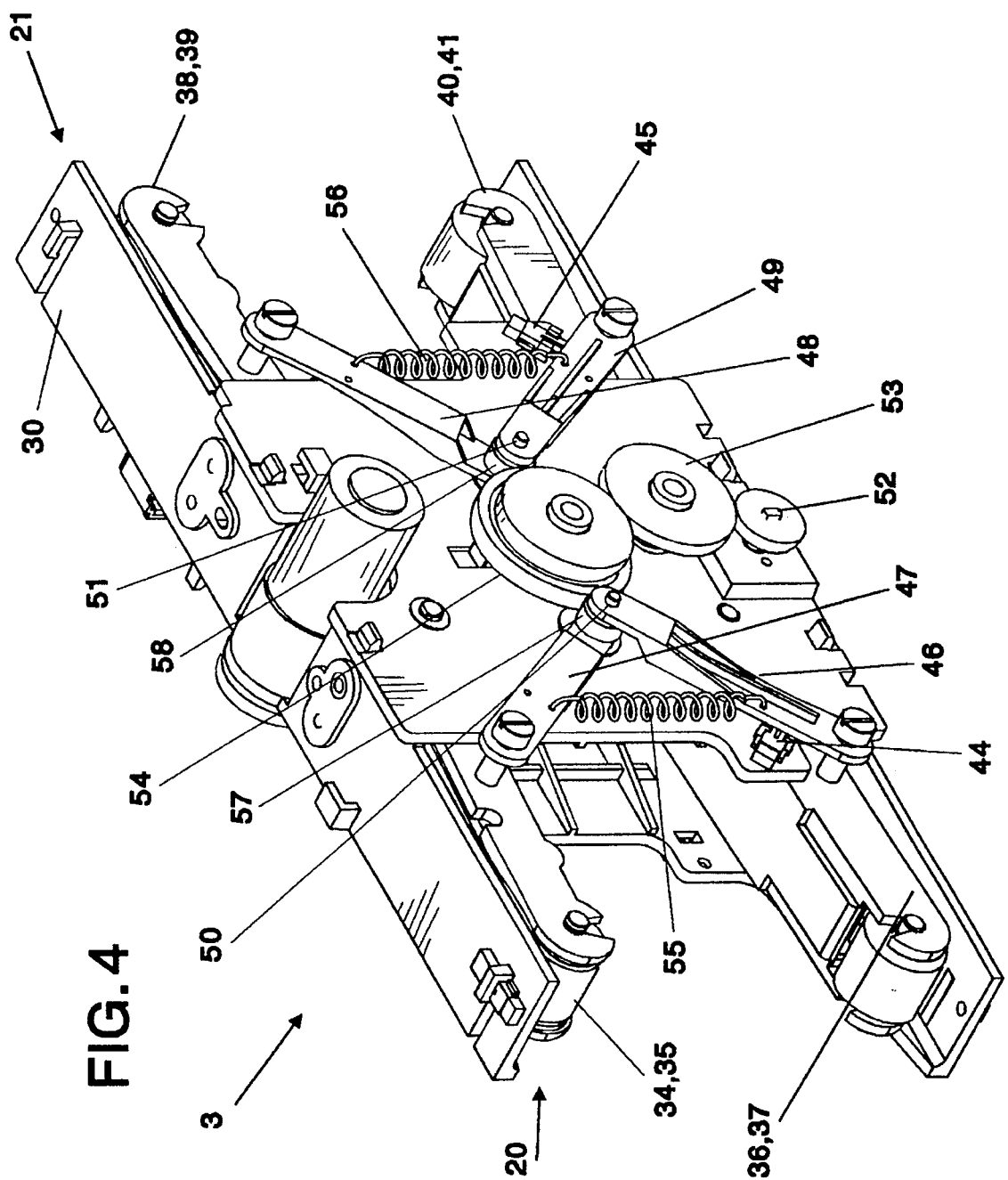
FIG. 4 is a perspective view of the picker assembly depicting the mechanism used to actuate the fore and aft grippers.

FIG. 4 depicts a reverse side of the picker assembly 3, and contains those components that actuate the fore gripper 20 and the aft gripper 21. The fore gripper 20 includes the timing belt 34 and support channel 35 that are connected to a plastic guide 36 by an upper linkage 47 and a lower linkage 46. An extension spring 55 provides tension between the upper and lower linkages 47, 46. Opposite ends of the upper and lower linkages 47, 46 share a common pivot shaft 50 and a roller bearing 57. The aft gripper 21 design and construction is similar to the fore gripper 20. By rotating a cam 54 that is centrally located between the tandem fore and aft grippers 20, 21, one of the two pivot shafts 50 or 51 will translate horizontally and actuate the appropriate fore or aft gripper 20, 21 open and closed. A motor 52 and cam 53 provide a mechanism for rotating the cam 54. The cam 54 profile will actuate the fore gripper 20 when the cam 54 is rotated ninety degrees while maintaining the aft gripper 21 in an open position, or vice versa. Consequently the tandem fore and aft grippers 20, 21 can be actuated independently to grip a data cartridge 5 on one side of the picker assembly 3 without disturbing a data cartridge 5 that resides on the opposite side of the picker assembly 3.

METHOD OF OPERATION

Referring again to FIG. 1, the function of the picker assembly 3 is to transfer a data cartridge 5 from the magazine 4 to the storage device 2, and subsequently return the data cartridge 5 to the originating storage cell within the magazine 4. The operation sequence begins when a request is sent to the automated storage system 1 to load into the storage device 2 a specific data cartridge 5 located within the magazine 4. The initial state of the picker is with the fore gripper 20 and the aft gripper 21 both in the open position, allowing the picker assembly to freely traverse the magazine 4. The accessor 6 will translate the picker assembly to be in line with the storage cell known to contain the requested data cartridge 5.

Figure 5:
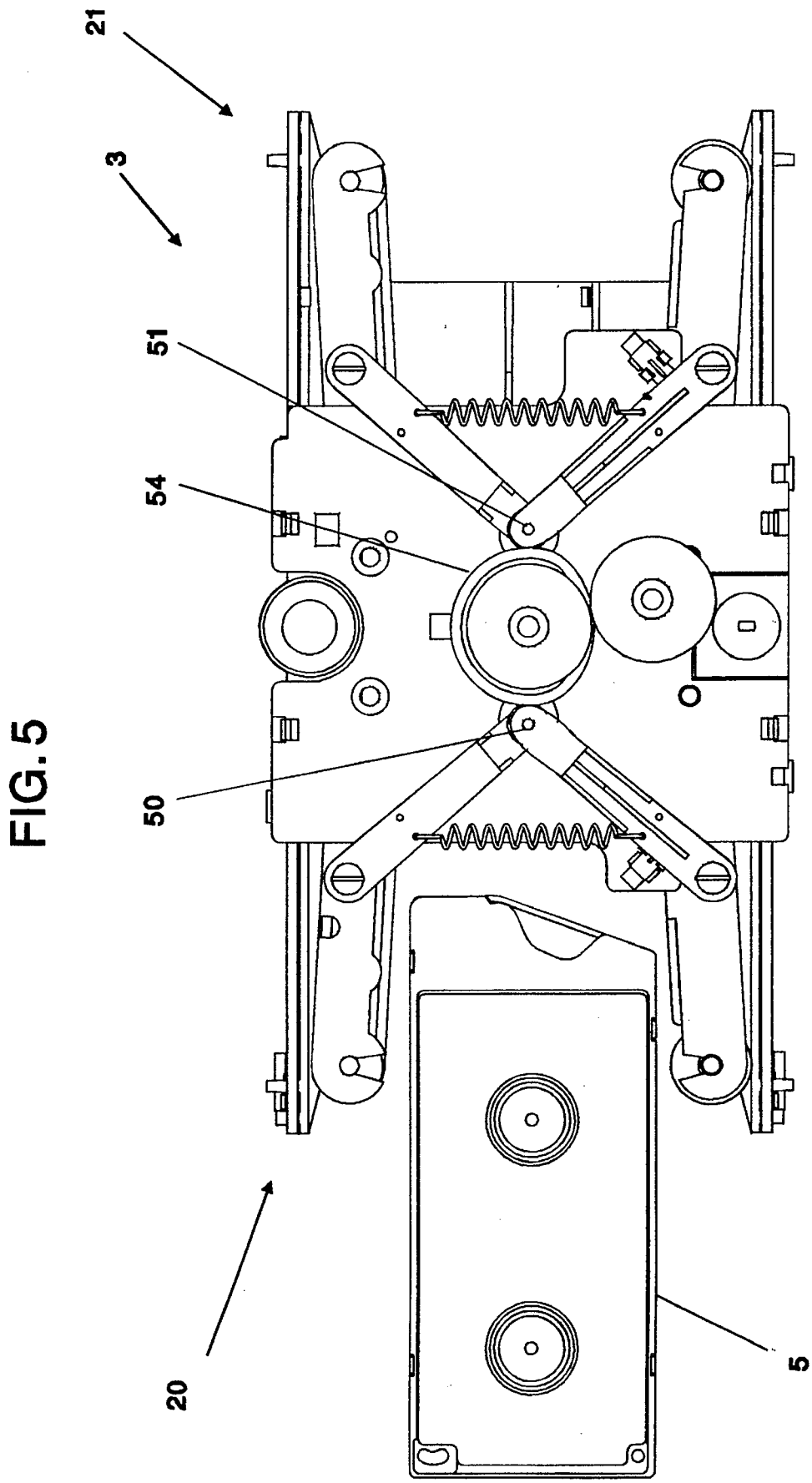
FIG. 5 is a side view of the picker assembly positioned at the magazine to retrieve a cartridge.

FIG. 5 is a side view of the picker assembly 3 when it has been translated to the position of the requested data cartridge 5. The cam 54 is in an initial position that sets the fore gripper 20 and the aft gripper 21 both in the open position. In this condition, the fore pivot shaft 50 and the aft pivot shaft 51 are positioned furthest from the cam's center of rotation, resulting in the tandem fore and aft grippers 20, 21 being open.

Figure 6:
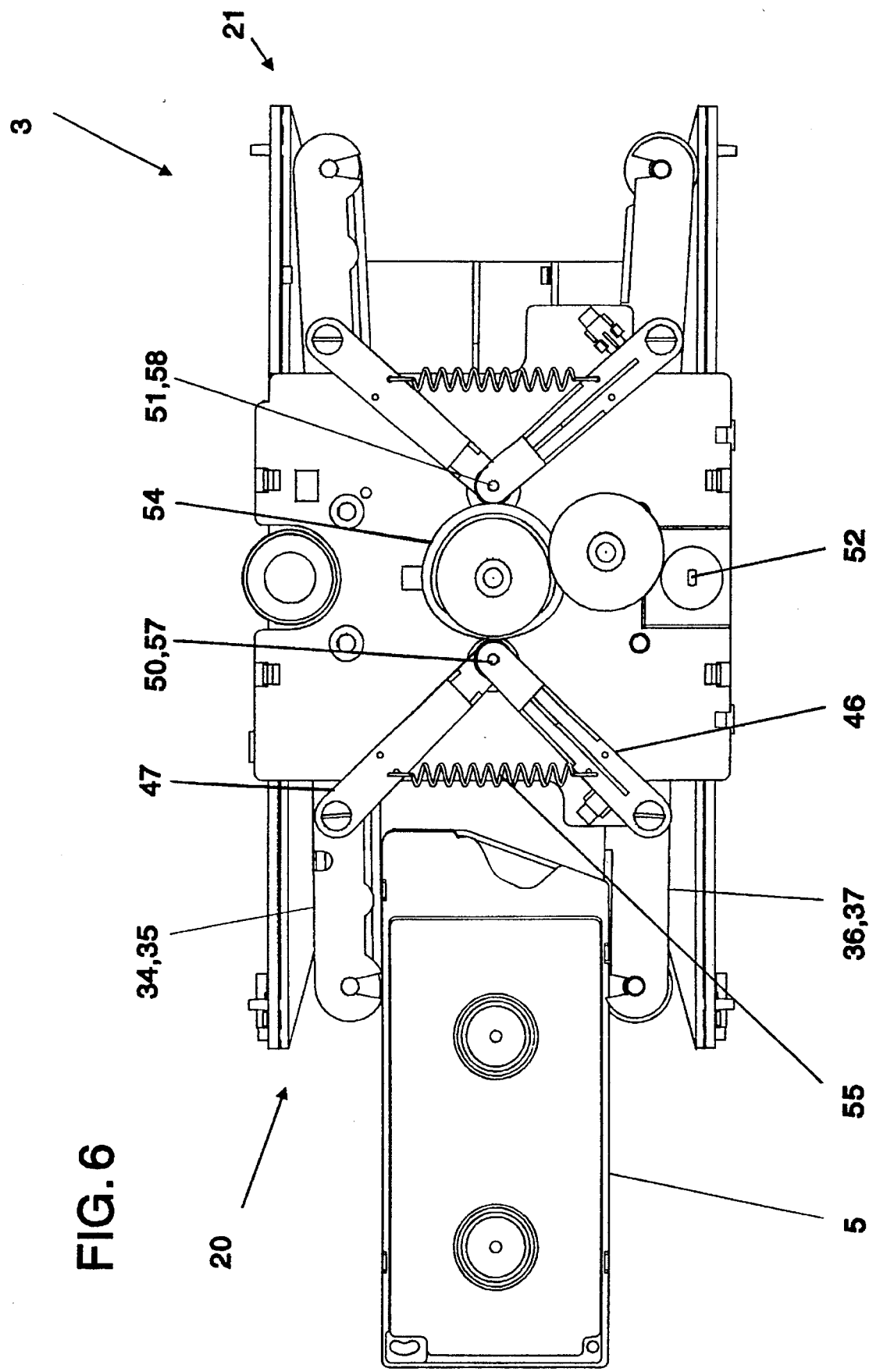
FIG. 6 is a side view of the picker assembly illustrating the fore gripper in the closed position.

The next step in the operation sequence is depicted in FIG. 6. The cam 54 has been rotated ninety degrees clockwise by the cam motor 52 (as viewed from the motor's shaft end). The cam's rotation allows the fore pivot shaft 50 to move nearer to the cam's center. In this case the fore pivot shaft 50 has moved to the right from its originating position in FIG. 5. The extension spring 55 provides tension between the upper linkage 47 and the lower linkage 46. This tension exerts a force upon the fore pivot shaft 50, to which the upper and lower linkages 47, 46 are connected, and keeps the fore roller bearing 57 in contact with the cam 54. As the fore pivot shaft 50 moves nearer the cam 54 center, the upper and lower linkages 47, 46 pivot together, causing the timing belt 34 and the lower plastic guide 36 to close and grip the data cartridge 5. The cam 54 profile is such that an aft pivot shaft 51 and roller bearing 58 remain stationary and the aft gripper 21 remains in an open position.

Figure 7:
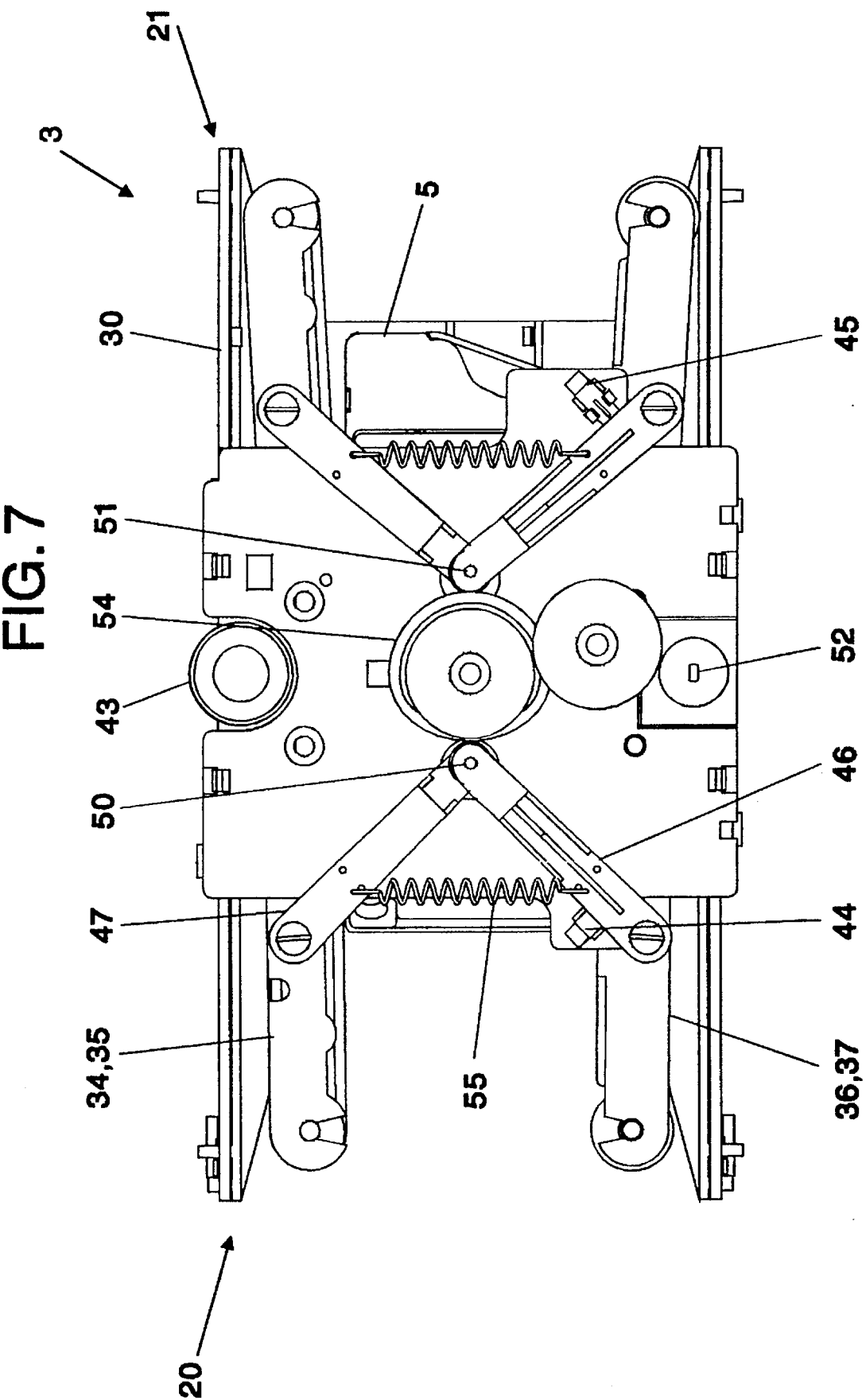
FIG. 7 is a side view showing the cartridge transferred to the center of the picker assembly, with the fore gripper in a closed position.

FIG. 7 illustrates the data cartridge 5 when it has been transferred fully into the picker assembly 3, that is the data cartridge 5 rests in the mounting channel 30. After the fore gripper 20 has closed and the timing belt 34 has contacted the surface of the cartridge, the timing belt 34 is rotated by the belt motor 43. The timing belt 34 acts as a friction drive to translate the data cartridge 5 from its initial position in FIG. 6 to the center of the picker assembly 3. The data cartridge 5 is driven into the mounting channel 30 until the data cartridge 5 is positioned between two infrared sensor pairs 44 and 45.

Figure 8:
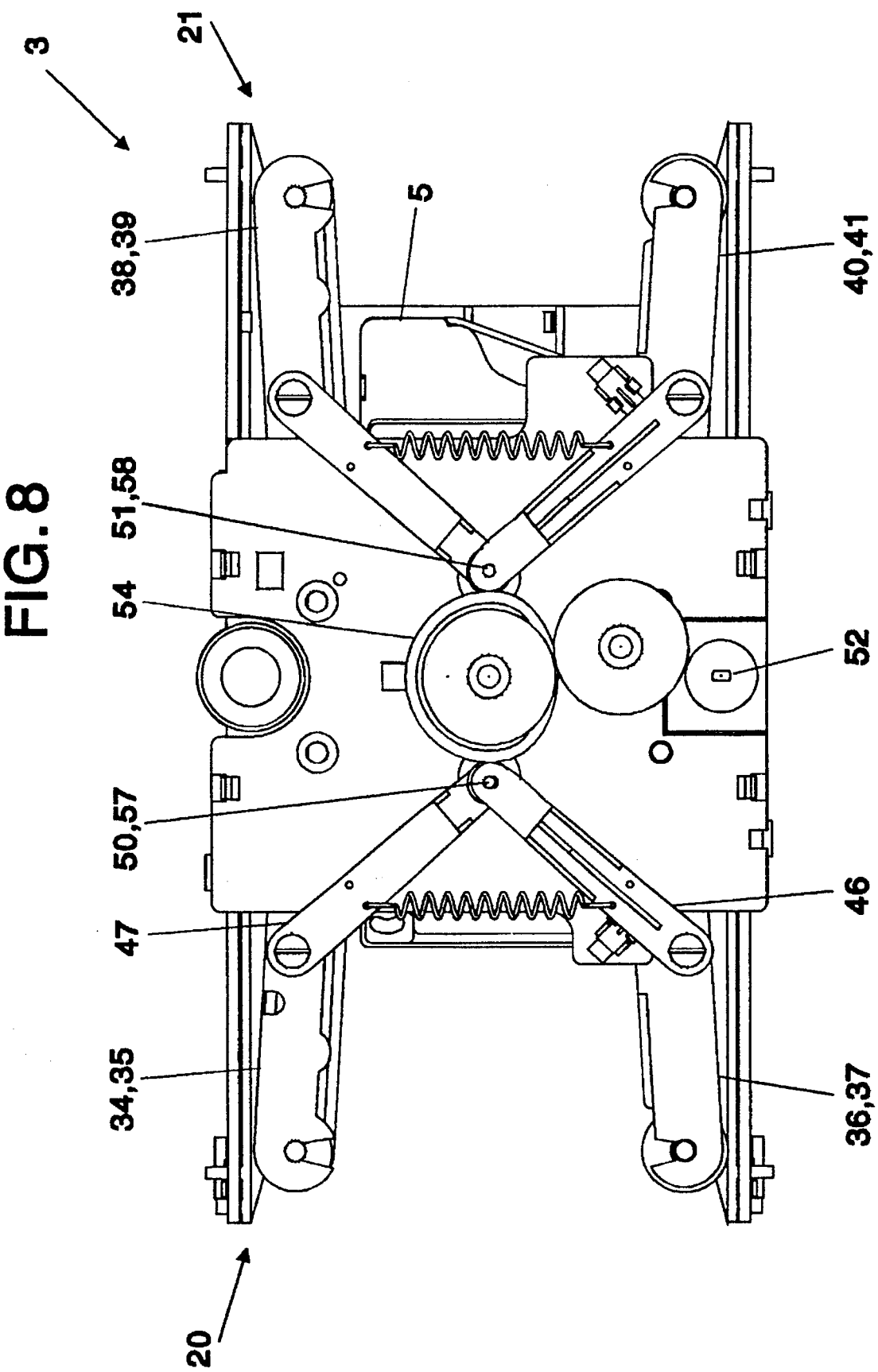
FIG. 8 is a side view of the picker assembly carrying a cartridge, wherein both fore and aft grippers are in the open position allowing the picker assembly to be translated to the storage device.

Referring to FIG. 8, a next operation stage is opening the fore gripper 20 to allow the picker assembly 3 to be translated to the storage device 2. The fore gripper 20 is opened by rotating the cam 54 ninety degrees counterclockwise via the cam motor 52. The cam 54 rotation will force the fore pivot shaft 50 to move further from the cam 54 center as the roller bearing 57 follows the cams's profile. As the fore pivot shaft 50 is translated the upper linkage 47 and the lower linkage 46 pivot open, whereby the fore gripper 20 opens. Both the fore timing belt 34 and the aft timing belt 38 contact the cartridge 5 at each timing belt 34, 38 inner pulley. This contact occurs regardless of whether the fore and aft gripper 20, 21 is in an open or closed position. The contact serves as retention for the cartridge within the picker assembly 3 as the picker assembly 3 is translated by the accessor 6. The retention prevents the cartridge from accidentally being Jostled loose of the picker assembly 3.

Figure 9:
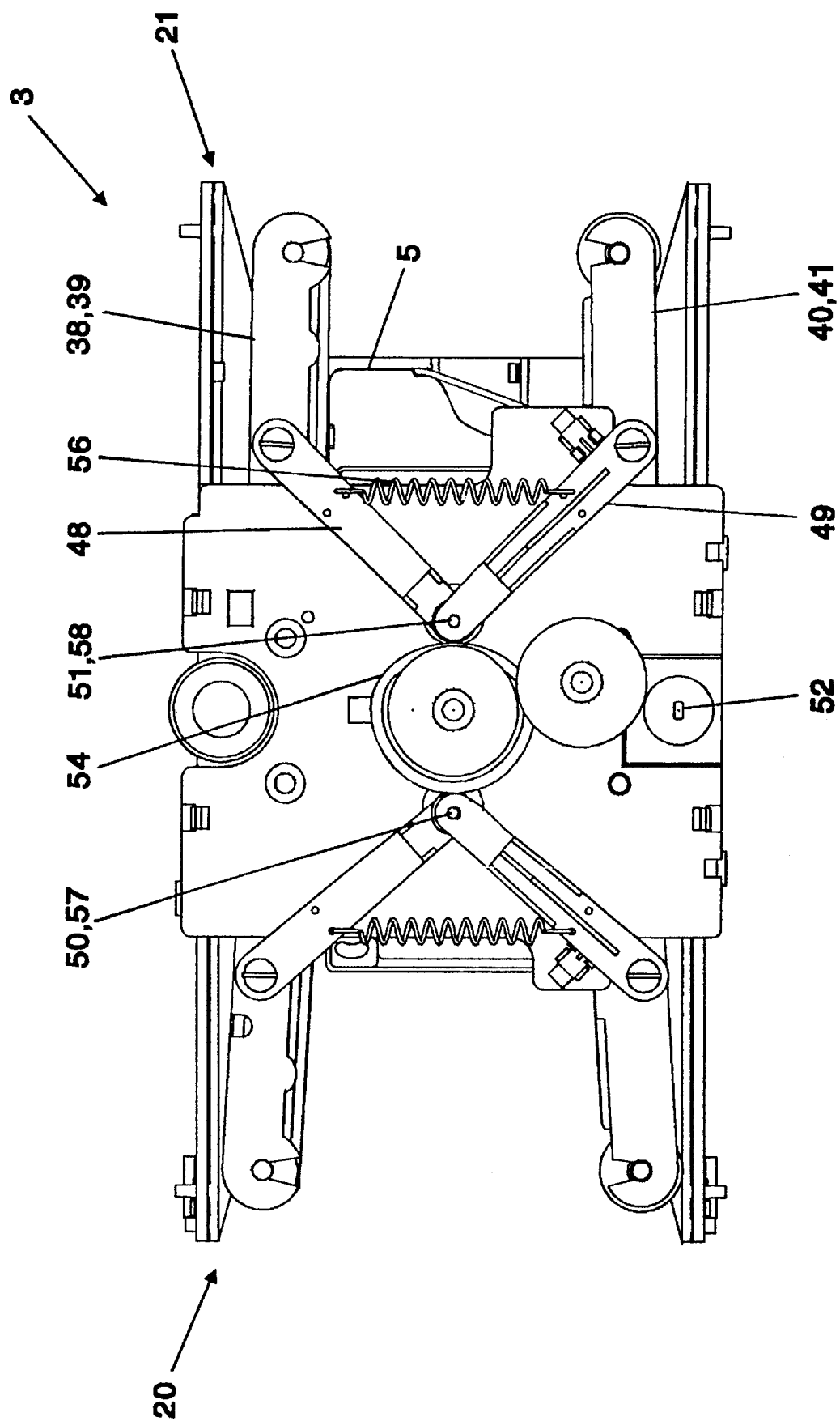
FIG. 9 is a side view depicting the picker assembly at the storage device with the aft gripper closed.

FIG. 9 depicts the picker assembly 3 when its has been translated in line with the storage slot of the storage device 2. The cam 54 has been rotated ninety degrees counterclockwise by the cam motor 52, resulting in the aft pivot shaft 51 moving nearer to the cam's center. In this case the aft pivot shaft 51 has moved to the left of its originating position in FIG. 8. An extension spring 56 provides tension between an upper linkage 48 and a lower linkage 49, keeping the aft roller bearing 58 in contact with the cam 54. As the aft pivot shaft moves nearer the cam's center, the upper and lower linkages 48, 49 pivot together, whereby the timing belt 38 and the lower plastic guide 41 close and contact the data cartridge 5. Again, the cam 54 profile is such that the fore pivot shaft 50 and roller bearing 57 remain stationary and the fore gripper 20 remains in an open position.

Referring to FIG. 10, the data cartridge 5 has been translated out towards the ends of the aft gripper 21. With the aft gripper 21 closed, the timing belt 38 has been driven by the belt motor 43, translating the cartridge to the position shown. The data cartridge 5 would now reside primarily within the storage device 2 (not shown).

FIG. 11 shows the final step in transferring a cartridge from the magazine 4 to the storage device 2. The cam 54 has been rotated ninety degrees clockwise by the cam motor 52. The aft pivot shaft 51 moves out from the cam 54 center as the roller bearing 58 follows the cam 54 profile. As the aft pivot shaft 51 is translated the upper linkage 48 and the lower linkage 49 pivot open, whereby the aft gripper 21 opens. The data cartridge 5 is no longer restrained by the picker assembly 3, and can be loaded into the storage device 2. While the data cartridge 5 is being processed, the picker assembly 3 may reside in line with a load slot of the storage device or may be used for transferring cartridges to other storage devices located within the same automated storage system, returning to the given storage device 2 when processing has been completed.

To return the data cartridge 5 from the storage device 2 to its originating storage cell in the magazine 4, the sequence illustrated in FIG. 5 through FIG. 11 is reversed. First the data cartridge 5 would be retrieved from the storage device 2 using the aft gripper 21, then transferred into the picker assembly 3. Once the data cartridge 5 is within the picker assembly 3, the picker assembly 3 can be translated to the originating storage cell within the magazine 4, whereupon the fore gripper 20 can be utilized to place the data cartridge 5 back into the magazine 4.

The picker assembly described herein provides a method to transport a data cartridge from a magazine to a storage device by implementing two tandem, independent grippers. Although the fore and aft grippers utilize a common motor to actuate each gripper, and a common motor to transfer the cartridge into the picker assembly, the two grippers can be actuated independent of one another. For example, the fore gripper can be actuated open or closed while the aft gripper remains open. The advantage gained by this method of operation is the capability to have usable magazine storage cells aligned and on each side of the picker assembly. Consequently the total storage capacity (number of storage slots) within an automated storage system can increase and fully utilize the available volume within the system.

In summary, an automated storage system for randomly selecting one storage medium from a plurality of storage media and transporting the selected storage medium therefrom has been described. The automated storage system includes a storage device for receiving the selected storage medium for retrieving data therefrom and/or storing data thereto.

A plurality of storage cells store the storage medium therein, the plurality of storage cells located across from and substantially parallel to the storage device. The storage media are oriented in the plurality of storage cells for direct transport to the storage device. A picker mechanism, has first and second grippers mounted in tandem such that the first gripper has access to the storage media, and the second gripper has access to the storage device. The first and second grippers further pass the selected storage medium therebetween, wherein the first and second grippers each have open and closed positions, the first and second grippers maintaining opposite open and closed positions. An accessor is positioned for carrying the picker mechanism and moving the picker mechanism between one of the plurality of storage cells and said storage device.

While the invention has been particularly shown and described with reference to preferred embodiments thereof, it will be understood by those skilled in the art that various changes in form and details may be made therein without departing from the spirit and scope of the invention. For example, various changes may be made to certain materials as long as the critical requirements are met, for example, weight, strength, etc. Still further, means for attaching structures together may be changed without departing from the scope of the invention.

What is claimed is:

1. A picker assembly for transporting a storage medium from a storage cell to a storage device and vice versa, the picker assembly comprising:

a mounting channel;

a fore gripper mounted parallel to said mounting channel;

an aft gripper mounted parallel to said mounting channel and tandem to said fore gripper;

a cam motor;

a cam drive train for coupling a rotation of said cam motor to said fore and aft grippers for closing said fore gripper and opening said aft gripper when said cam motor is rotated to a first position, for closing said aft gripper and opening said fore gripper when said cam motor is rotated to a second position, and for opening both said fore and aft grippers when said cam motor is rotated to a third position; and a translation motor coupled to said fore and aft grippers for translating the storage medium from said fore gripper to said aft gripper when said translation motor is rotated in a first direction, and for translating the storage medium from said aft gripper to said fore gripper when said translation motor is rotated in a second direction.

2. The picker assembly according to claim 1 wherein said cam drive train couples the rotation of said cam motor to said fore and aft grippers such that said fore gripper opens and closes independently of said aft gripper.

3. The picker assembly according to claim 1 further comprising a belt drive train coupled to said translation motor for translating the storage medium between said fore and aft grippers.

4. The picker assembly according to claim 1 further comprising an accessor for mounting said picker mechanism thereon, said accessor mechanism moving said picker assembly in a direction parallel to the storage device and the storage cell.

5. The picker assembly according to claim 4 further comprising a sensor for signalling said picker assembly that the storage medium is located in said mounting channel within both fore and aft grippers.

6. The picker assembly according to claim 5 wherein said picker assembly responds to said sensor signal by directing the rotation of said cam motor to a different position.

7. An automated storage system for randomly selecting one storage medium from a plurality of storage media and transporting the selected storage medium therefrom, said automated storage system comprising:

a storage device for receiving the selected storage medium for processing data thereto;

a plurality of storage cells for storing the plurality of storage media therein, said plurality of storage cells located across from and substantially parallel to said storage device, the storage media being oriented in said plurality of storage cells for direct transport to said storage device;

a pass-through picker mechanism, having first and second grippers mounted in tandem such that said first gripper has access to said storage media in said plurality of storage cells, and said second gripper has access to said storage device, a translation drive to move the selected storage medium relative to said first and second grippers thereby passing the selected storage medium therebetween, said first and second grippers each having open and closed positions, said first and second grippers maintaining either opposite open and closed positions or concurrent open positions; and an accessor positioned for carrying said pass-through picker mechanism and moving said pass-through picker mechanism between said plurality of storage cells and said storage device.

8. The automated storage system according to claim 7 further comprising a motor coupled for opening and closing said first and second grippers.

9. The automated storage system according to claim 7 wherein the storage media are magnetic tape cartridges.

10. The automated storage system according to claim 7 wherein said storage media are optical disks.

* * * * *